Sept. 3, 1929.  H. STARKE ET AL  1,726,866
ELECTROSTATIC VOLTAGE METER
Filed Jan. 7, 1928
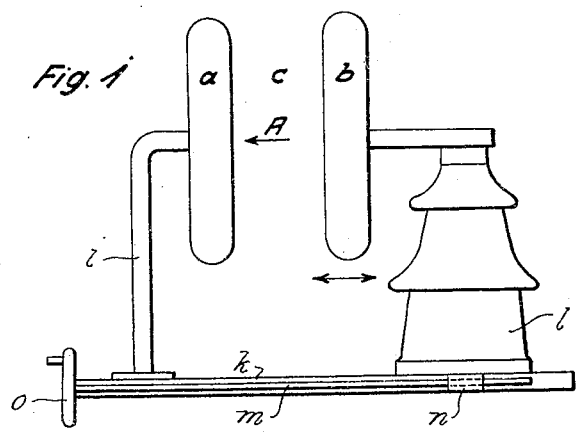
Fig. 1
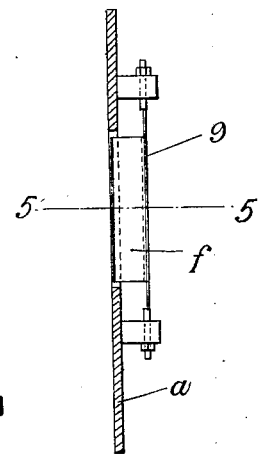
Fig. 4.
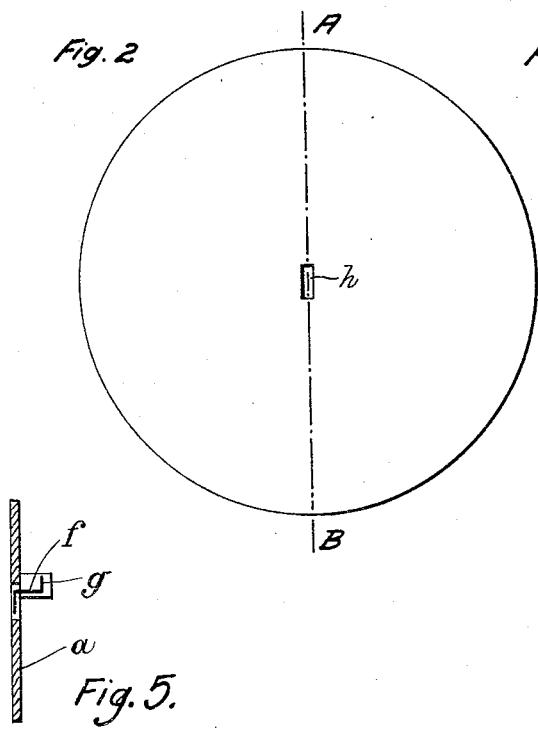
Fig. 2.
Fig. 5.
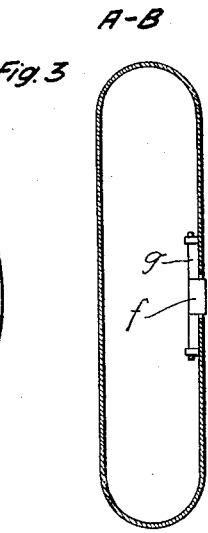
Fig. 3.
Inventors
Hermann Starke &
Richard Schroeder
By Knight Bros
attys Patented Sept. 3, 1929.

1,726,866

UNITED STATES PATENT OFFICE.

HERMANN STARKE AND RICHARD SCHROEDER, OF AACHEN, GERMANY.

ELECTROSTATIC VOLTAGE METER.

Application filed January 7, 1928, Serial No. 245,188, and in Germany December 11, 1926.

This invention relates to an electrostatic voltage indicator or measuring device for voltages up to several hundred kilovolts. A drawback found in most of the known instruments is the danger of sparking, due to the existence of a great potential difference between parts which are close together. For the elimination of this drawback, two methods have been substantially followed. Either the measuring instrument itself was placed in a casing containing compressed gas, or the voltage to be measured was subdivided by means of auxiliary condensers so that the measuring instrument was exposed only to a small voltage. The first process is used in a large measuring instrument of the firm of Hartmann & Braun (Palm. ETZ,) which represents Thomson's absolute electrometer placed in compressed gas, in which the absolute voltages are calculated from the attraction of two plates provided with a protective ring. Such an instrument is of course costly. In the voltage division process it is necessary to have the best possible insulation of all the parts, for which reason the process is not applicable to direct current voltages. The measuring spark gaps which are also used for the measurement of high voltages, are not generally applicable. For instance it is usually impossible to carry out voltage measurement of charged cables or condensers, as they are discharged by the spark. These drawbacks are eliminated by the voltage meter according to the present invention.

An example of the invention is shown in the accompanying drawing, in which

Figure 1 represents a front elevation of an electrostatic voltage meter with our improved arrangement.

Figure 2 is a view on a larger scale of one of the plates of the voltage meter, as seen in the direction of the arrow A, Figure 1.

Figure 3 is a view in vertical section of the plate of the voltage meter shown in Figure 2, taken along A—B.

Figures 4 and 5 are enlarged sectional elevational views of structural details.

Similar letters of reference indicate corresponding parts throughout the several drawings.

Referring to the drawings, two plates $a$ and $b$, which form the electrodes between which an electric field is set up, are mounted opposite each other on pedestals $i$ and $l$. $i$ is shown as a metallic rod or pipe which serves to ground the plate $a$ to the base $k$, while $l$ is an insulator mounted so that it can be adjusted along the base by means of a screw $m$ having an adjusting wheel $o$ and threaded in a boss $n$ on the bottom of insulator $l$. By means of this arrangement of the insulator $l$ and screw $m$ the distance between the electrodes $a$ and $b$ can be adjusted. In a small central opening $h$ of the plate $a$ is arranged a thin light metal vane $f$ which is supported on a stretched thread $g$ of elastic material, which forms a good sort of frictionless axis. Movement of the plate from a normal or zero position is resisted by torsion of the thread upon which it is supported. In place of this form of mounting, any other kind adapted to resist movement of the vane from zero position could be used. The vane is electrically connected to the plate $a$, in the present instance by means of its metallic supporting thread $g$. The rotation of the vane is measured in known manner such as by means of a pointer moving over a scale or by observing the movement of a spot of light reflected from a mirror attached to the vane. An electric field at the vane tends to turn it out of the plane of the plate towards $b$, on account of the charge produced by influence, with a force proportional to the square of the strength of the field. This force would be therefore exactly proportional to the square of the potential on the plate $b$, but must be measured only with the unchanged position of the vane, that is to say for instance by the back torsion which is required to hold the vane in its zero position in the plane of the plate in opposition to the action of the field (principle of the absolute electrometer, in the constructions of which the movable conductor is generally brought to its position of rest not by torsion, but by gravity or electrodynamically).

In the new instrument according to this invention, the movable vane is not held in its position of rest, but is allowed to turn out of the plane of the plate. In that way, the readings of the measuring device are not in exact proportion to the square of the voltage, the more so, the greater the deflection of the vane. In spite of that, however, the following calibration process characteristic of the invention can be applied to the whole instrument:

A calibration of the scale of the instrument is carried out with a relatively small distance $c$ between $a$ and $b$, with the assistance of relatively low known voltage (by comparing the measuring instrument, with an electrometer or voltmeter). Let it be assumed that a good range of measurement is for instance from 1,000 to 10,000 volts. The measuring range for higher voltages is then obtained by increasing the distance between the plates $a$ and $b$. The calibration of the whole scale for this plate distance $d$ will be now known as soon as a single point of the new calibration curve is known. If for instance the sensitiveness has been reduced, by the increase of distance, to such an extent that the deflection which was produced by 1,000 volts with the distance $c$, is now produced by 10,000 volts with the distance $d$, the new scale will have now direct connection to the previous ones, and to each deflection will now correspond a voltage value ten times greater than before; that is to say, the scale has now a measuring range of 10,000 to 100,000 volts, thereafter the calibration remaining the same as before. It will be clear that in such a manner the calibration of still higher measuring ranges can be effected without any limitation.

For the sake of strict accuracy of said calibration, only the following must be taken into account:

1. The rotatable vane must not exercise an influence in any perceptible manner on the conductor $b$, that is to say must not influence in a perceptible manner the distribution of the charge on $b$. This would result in the calibration curve assuming a different shape for different distances $a$—$b$, and therefore the same calibration curve could not be transferred directly to the different plate distances. As proved by control experiments, this disturbing effect can be entirely eliminated by making the movable vane small relatively to the plates and the plate distances $a$—$b$ utilized. The greater the latter, the less of course such an influence of the vane would be felt.

2. During the measurements, that is to say once the calibration for a plate distance $a$—$b$ has been effected, the near surroundings of the instrument must not be changed. This would be liable to produce a field distortion which, when it remains constant and exists already during the calibration, does not have a disturbing effect, but in the event of an alteration between the measurements, would naturally produce an error in the measuring results. Control observations on the apparatus have however shown that if the plates $a$ and $b$ are of sufficient size, such error does not take place to a perceptible extent, even when one comes as close to the apparatus as allowed by the high tension. For that reason it appears superfluous to mount the instrument in a fixed metal casing which would strictly eliminate the possibility of such an error, but would considerably increase the cost.

From the above observations it follows that so long as the vane is small enough in comparison to the other dimensions of the apparatus there is no difference in the shape of the calibration curve for all ranges i. e. for whatever distance of electrodes $a$ $b$ is employed. It appears therefore a characteristic quality of the new apparatus that the vane is very small in comparison to the electrodes and the distances between them.

Having thus described our invention, we claim as new and desire to secure by Letters Patent:

1. A high-tension measuring apparatus comprising two high tension electrodes, means for adjusting the distance between said electrodes, and a device sensitive to an electric field located in proximity to one of said electrodes and adapted to adjust itself in accordance with the strength of field between said electrodes, said device being so small in comparison with the size of said electrodes that practically no electric influence is produced on the opposite electrode by its adjustment.

2. A high-tension measuring apparatus in accordance with claim 1 in which said device sensitive to an electric field comprises a movable vane metallically connected to the electrode near which it is located.

3. A high-tension measuring apparatus in accordance with claim 1 in which said device sensitive to an electric field comprises a movable vane metallically connected to the electrode near which it is located, and a stretched elastic thread upon which said vane is mounted.

In testimony whereof we affix our signatures.

HERMANN STARKE.
RICHARD SCHROEDER.